(12) United States Patent  
Wood et al.

(10) Patent No.: US 6,965,609 B1  
(45) Date of Patent: Nov. 15, 2005

(54) CONFIGURABLE BASIC RATE INTERFACE

(75) Inventors: Michael Joseph Wood, San Jose, CA (US); Teh-Wei David Chen, Saratoga, CA (US); Yaan Mirng Jeffrey Chen, San Jose, CA (US); Sajjad Chaudhary, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 965 days.

(21) Appl. No.: 09/726,948

(22) Filed: Nov. 29, 2000

(51) Int. Cl.[7] .............. H04J 3/16; H04J 3/22
(52) U.S. Cl. ............ 370/465; 370/463; 370/469
(58) Field of Search ............... 370/419, 420, 370/463, 466, 524, 465, 464, 400, 469, 401, 370/421, 423, 489, 904, 901, 903, 395.62, 370/353, 354, 352, 351, 355, 356, 522; 709/220, 709/250

(56) References Cited

U.S. PATENT DOCUMENTS

| | | | | |
|---|---|---|---|---|
| 5,157,665 A | * | 10/1992 | Fakhraie-Fard et al. | .... 714/712 |
| 5,208,846 A | * | 5/1993 | Hammond et al. | ........ 379/9.06 |
| 5,214,650 A | * | 5/1993 | Renner et al. | ............. 370/276 |
| 5,412,660 A | * | 5/1995 | Chen et al. | .................. 370/318 |
| 5,450,486 A | * | 9/1995 | Maas et al. | ............. 379/399.01 |
| 5,574,870 A | * | 11/1996 | Dziennus et al. | ........... 710/305 |
| 5,621,731 A | * | 4/1997 | Dale et al. | .................. 370/257 |
| 5,796,955 A | * | 8/1998 | Takahashi et al. | .......... 709/232 |
| 5,931,928 A | * | 8/1999 | Brennan et al. | ............... 710/68 |
| 6,005,846 A | * | 12/1999 | Best et al. | .................. 370/264 |
| 6,009,093 A | * | 12/1999 | Choe | ......................... 370/376 |
| 6,031,848 A | * | 2/2000 | Brennan | ..................... 370/522 |
| 6,118,796 A | * | 9/2000 | Best et al. | .................. 370/524 |
| 6,304,574 B1 | * | 10/2001 | Schoo et al. | ................. 370/401 |
| 6,584,112 B1 | * | 6/2003 | Takahashi | .................... 370/420 |

* cited by examiner

Primary Examiner—Wellington Chin  
Assistant Examiner—Jamal A. Fox  
(74) Attorney, Agent, or Firm—Marger Johnson & McCollom, P.C.

(57) ABSTRACT

A network device with a configurable interface. The device has at least two communication ports. An interface in communication with the ports is configurable as to the network layer, or layer 2 and 3, and the physical layer, or layer 1. The interface includes at least two lines for transmitting data and two lines for receiving data and a processor that determines the data transmitted and received. The processor controls the data in accordance with the configuration parameters of the interface, which are each independently selectable.

10 Claims, 2 Drawing Sheets

CONFIGURABLE BASIC RATE INTERFACE

BACKGROUND

1. Field

This invention relates to network interfaces, more particularly to Integrated Services Digital Network (ISDN) interfaces.

2. Background

ISDN network architectures convey information from multiple networks to users. Typically, an ISDN transmits across two 64,000 bits per second (kbps) bearer, or B, channels, and one 16 kbps data, or D, channel. The D channel is used for signaling and control of the connection.

Various types of equipment maybe connected to the ISDN network through an interface. Users typically connect through various devices that are referred to as terminal equipment (TE). TE devices communicate to the network through network terminal (NT) equipment. NT equipment, also referred to as server-side, network-side, or network, interfaces may be between TE or other NT devices.

The two different interfaces, TE and NT, have specific characteristics with which they are associated. These characteristics are usually set out in Layers, using the term Layer as used in the Open System Interconnection (OSI) reference model. ISDN typically uses the first three layers. In the OSI reference model, layer 1 is the physical layer that manages putting data on the network and getting data off of the network. Layer 2 is the data link layer handling the physical passing of data. Layer 3 is the network layer, which routes data from one node to the other.

Typically, an interface identified as a TE interface will have specific characteristics of the physical and data link layers, such as synchronizing the clock from the connected line rather than sourcing its own. In addition, the network will view devices connected to this interface as a user-side device. This may cause a determination by the network as to what signals and messages can be sent to this particular device, because the network views it as user-side.

In addition, the TE layer 1 characteristics will include a clock synchronized from the connected line and no phantom power. Phantom power refers to a DC bias voltage provided on the line by NT interfaces, not provided by TE interfaces. These are just mentioned as an example, but become important factors when providing a network interface.

NT interfaces are currently assumed to have a network side layer 3. The network views them as a network interface, which in this instance means that the interface is between two network devices. NT interfaces typically have the characteristics of sourcing a clock and providing phantom power.

Currently, these interfaces are fairly rigid. Once an interface has been set up and configured, it is very difficult to change the characteristics without providing a new network interface board. These network interface boards are printed circuit boards, which are commonly referred to as network interface cards (NICs) or wide-area-network interface cards (WICs). In addition, the interfaces do not typically have separable layers. As mentioned above, if the physical layer is designated at TE, the network layer will be user-side. The clock will be synchronized from the interface and there will be no phantom power provided.

A user may have a legacy private branch exchange (PBX) that requires a user-side interface for layer 3. Currently, this interface would be designated as TE. If the user desires to have some of the additional signals and features that are available through NT interfaces, the user would have no method or means to obtain those. If the layers were separable, the user could designate the interface as NT and may gain access to some of those additional features and services, while meeting the requirement of having a user-side layer 3. However, this is not currently possible.

Some current interfaces allow a limited amount of flexibility. For example, the 6400 Vanguard™ Series from Motorola allows some configurability of network interface cards. However, the selectability is essentially only to select whether the interface is for TE or NT. Once that selection is made, there is no further flexibility. This does not solve the problems previously mentioned.

Therefore what is needed is a configurable interface that has separable layers.

SUMMARY

One embodiment of the invention is a network device having a configurable interface. The device has at least two communication ports. An interface in communication with the ports is configurable as to the network layer, or layer 2 and 3, and the physical layer, or layer 1. The interface includes at least two lines for transmitting data and two lines for receiving data and a processor that determines the data transmitted and received. The processor controls the data in accordance with the configuration parameters of the interface, which are each independently selectable.

Another embodiment includes software code that provides a user interface to allow configuration of the interface. The software code allows the user or installer to select the settings for each parameter independently of the other parameters.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
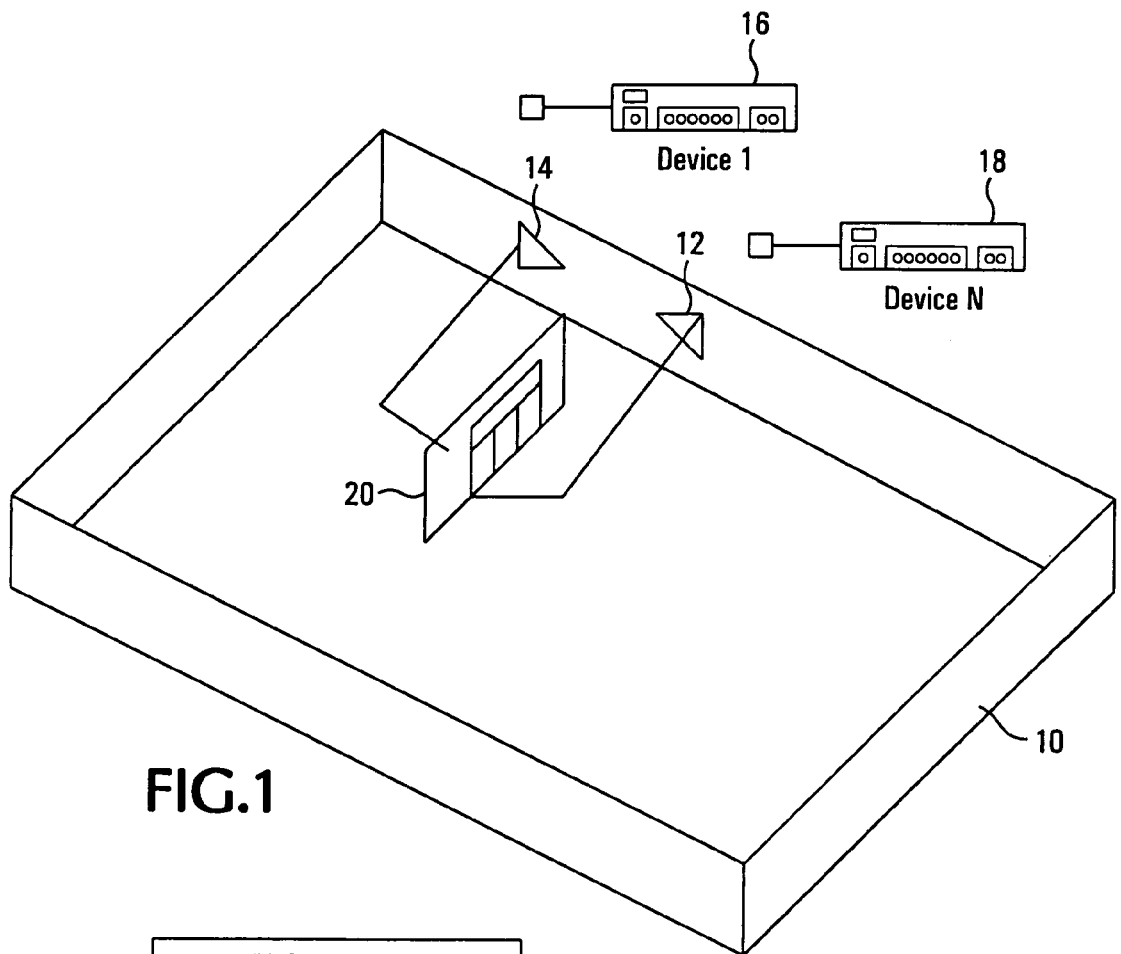
FIG. 1 shows a network device having a configurable interface, in accordance with the invention.

FIG. 1 show one embodiment of a network device with a configurable interface, in accordance with the invention. Network devices may include routers or concentrators. The network device 10 has at least two communication ports 12 and 14. These ports allow the network device to connect, typically through a network, with other devices. Device 16 and 18 are shown as examples of devices to which the network device may be connected. The connection may be through a direct line connected to the port, or through another device connected through the ports.

The interface between the ports allows the devices using each port to communicate with each other. For example, if two devices are on an ISDN network, the interface allows the two devices to transfer data using the appropriate protocols for ISDN. If device 16 is a terminal equipment (TE) device, the interface will function to communicate between the TE device and other devices on the network. For example, the device 18 may be a network terminal (NT). The TE interface will allow the device 16 to communicate with the network through the NT device 18. Alternatively, the device 16 may be a network terminal device as well. In this example, the interface would be an NT interface.

Figure 2:
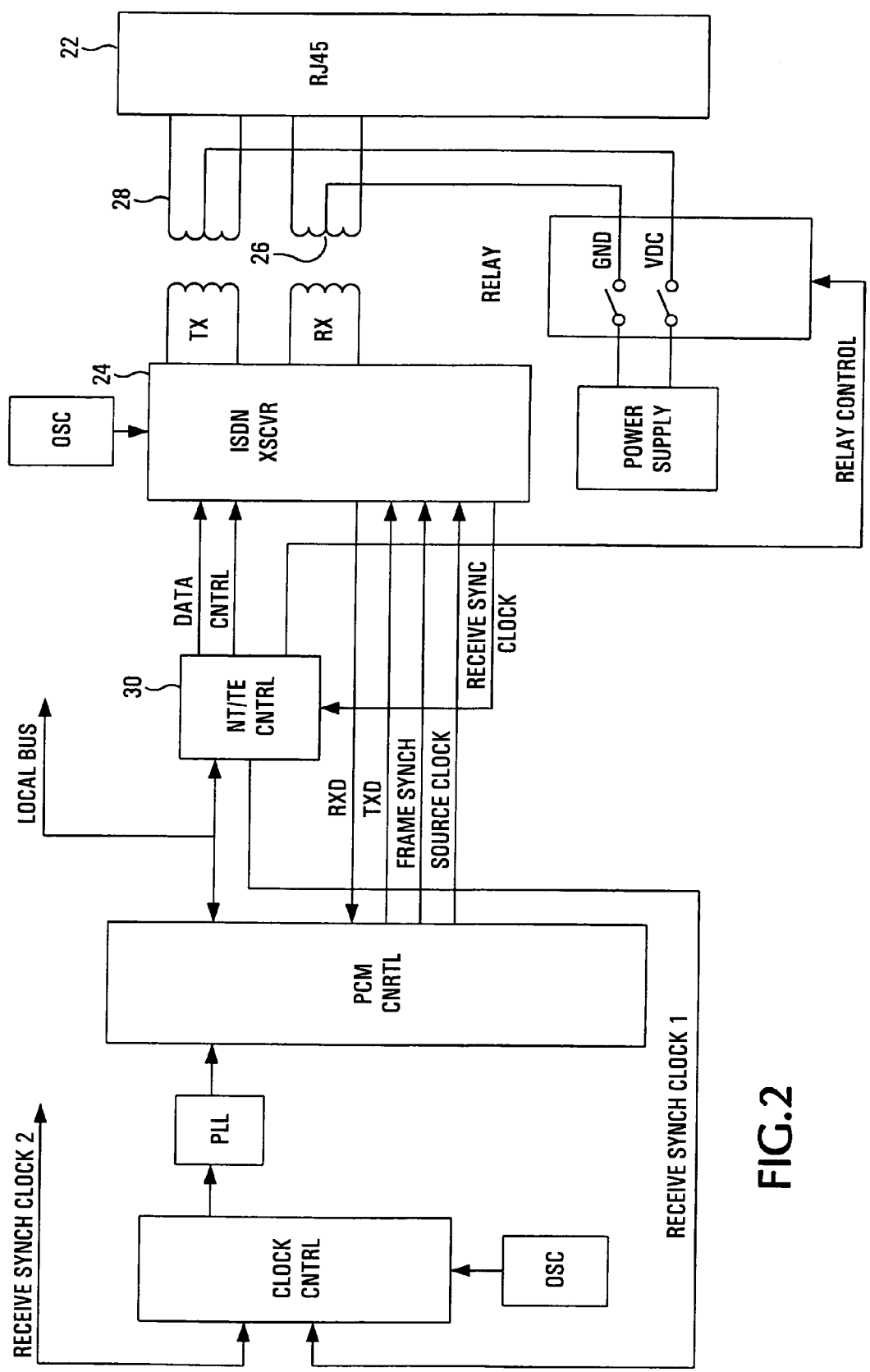
FIG. 2 shows a network interface card providing a configurable interface, in accordance with the invention.

The network device shown in FIG. 1 could have several other configurations. It is shown as a chassis with a printed circuit board, or 'card', containing the configurable interface. However, the configurable interface could be in some other form, including part of a main circuit, or 'mother', board. Similarly, the configuration of the card 20 shown in FIG. 1 could be of several configurations. One such configuration is shown in FIG. 2.

Card 20 will typically include at least transmission line 28 and at least one reception line 26. These lines connect from the card to other network devices through the connector 22. The ISDN transceiver 24 receives the data signals on the transmitting and receiving lines as well as control signals. The configurability of the interface lies partially within the programming of the transceiver. An internal register in the transceiver is loaded with the selection of NT or TE, and clock source or clock synch. The control bus between the transceiver 24 and the NT/TE controller 30, configures the selection between NT and TE, as an example. The selection is made via a user interface provided by software in the processor that provides a user interface for configuration of the network interface. The details of the interface will be discussed in more detail later.

As mentioned previously, current interfaces allow some limited configurability. The installer can select whether the interface is to be TE or NT, and the rest of the settings are determined from that selection. However, no interfaces are configurable in a manner allowing separation of the three layers used in interfaces such as ISDN (Integrated Services Digital Networks).

ISDN transmissions are governed by several established protocols. The International Telecommunications Union (ITU) has defined ISDN to function under an ITU Recommendation on ISDN layer 1, referred to as I.430. In this specification, the characteristics of layer 1 of the interface, mentioned above, are set out.

Layer 1 has a physical requirement of being able to carry 192 kbps. However, the characteristics of the connection established by layer 1 have an effect on the nature of the bits between the devices on that node. The characteristics of most interest here are the provision of power (phantom power) and clocking, either synchronized to the network, or sourced by the device. Typically, NT interfaces source a clock and provide power while TE interfaces synchronize with a system clock and do not provide power.

Layer 2 controls the passing of data between the devices on the interface, such as receiving or taking information from the network and sending information to the network (i.e., layer 3). However, this information is provided by a series of bits across the interface. These bits are extracted by line devices that create the clock and the data. The passing of these bits is controlled by the protocols and formats of layer 1. Therefore, layer 1 and layer 2 characteristics inter-relate and may be controlled together in a configurable interface.

The configurable interface shown in FIG. 2 can have several combinations of characteristics, depending upon the selections made by the installer. A list of possible combinations, as examples of the configurability of the interface, is shown in the below table.

| Layer 1 Clock | | Phantom Power Provided (Yes/No) | Layer 2 and 3 |
|---|---|---|---|
| TE | Synch | Yes | User-side |
| TE | Synch | Yes | Network-side |
| TE | Synch | No | User-side |
| TE | Synch | No | Network-side |
| NT | Source | Yes | User-side |
| NT | Source | Yes | Network-side |
| NT | Source | No | User-side |
| NT | Source | No | Network-side |
| NT | Synch | Yes | User-side |
| NT | Synch | Yes | Network-side |
| NT | Synch | No | User-side |
| NT | Synch | No | Network-side |
| TE | Source | Yes | User-side |
| TE | Source | Yes | Network-side |
| TE | Source | No | User-side |
| TE | Source | No | Network-side |

The selections can be made by the installer or remotely. While current interfaces typically require new hardware and a service call, the configurable interface requires neither. The configurable interface can be configured and then installed, to be altered as needed, or it can be installed and then configured remotely. Alteration of the interface can be done merely by accessing the software.

Figure 3:
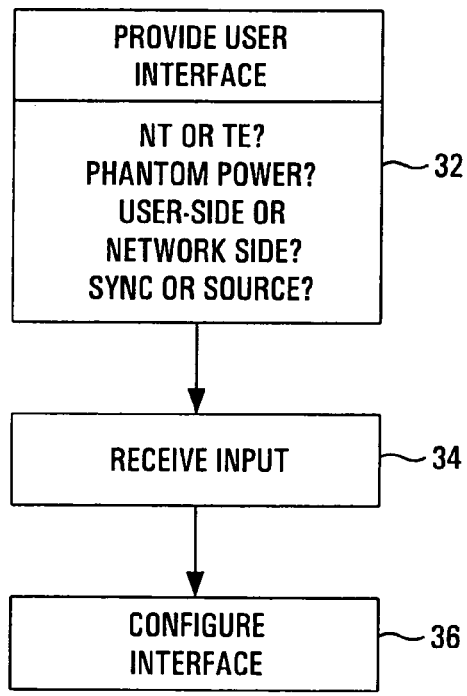
FIG. 3 shows one method of configuring a network interface card, in accordance with the invention.

The software installed in the processor 24, or an associated memory, not shown, can be used to configure the interface. One embodiment of a method of providing a user interface is shown in FIG. 3. A user interface is provided at 30. The user interface could be as simple as a command line prompt, or a pop-up window used at a remote terminal. The user interface will allow selection of the layer 1 to be either TE or NT. It may also allow selection to provide phantom power or not, independent of the type of layer 1 selection made. Finally, the layer 2 and 3 can be selected independent of the other two choices made.

Once the selections have been made through the interface, the processor receives input at 32. It then configures the interface accordingly at 34. This interface can be provided anytime the configuration needs to be changed. One possible example would be an installation in a 'safe' mode. In some instances, configuring an interface as TE is easier to initialize than an NT interface, making TE the 'safe' mode. Once the interface is up, it can be brought into the proper configuration a stage at a time, making troubleshooting and testing easier.

The configurability of the interface will more than likely be provided through software code in a computer-readable format. The computer that will execute the code will be either the processor on the card or a processor of a remote system used to configure the interface by communicating with the card. When the code is executed, it will perform the methods of the invention.

Execution will result in the user interface being made available for selection of the settings for each layer parameters discussed above. The code will cause the processor to receiving the settings and configure the interface in accordance with those settings. The code provides an easy and convenient way to configure the interface.

Thus, although there has been described to this point a particular embodiment for a method and apparatus for a configurable interface, it is not intended that such specific references be considered as limitations upon the scope of this invention except in-so-far as set forth in the following claims.

What is claimed is:

1. A network device, comprising;
   at least two communication ports, wherein each port is operable to communicate with a different device;
   an interface operable to provide communication between at least two ports, wherein the interface is configurable at any time as to a physical layer and a network layer, independently.

2. The network device of claim 1 wherein at least one device is a terminal equipment device.

3. The network device of claim 1 wherein at least one device is a network terminal device.

4. The network device of claim 1 wherein the interface is further configurable as to synchronized or sourced clock.

5. The network device of claim 1 wherein the interface is further configurable to provide phantom power.

6. A network interface, comprising:
   at least two lines operable to allow reception of data;
   at least two lines operable to allow transmission of data;
   a processor, wherein the processor is operable to allow alteration of the characteristics of the interface with respect to the physical layer and the network layer at any time thereby altering the data received and transmitted.

7. The interface of claim 6 wherein the processor is further operable to allow alteration of a clock and a power signal.

8. A network interface, comprising:
   means for receiving data;
   means for transmitting data;
   means for altering an interface with respect to the physical layer and the network layer at any time thereby altering the data received and transmitted.

9. A method for providing a configurable network interface, comprising:
   providing a user interface operable to allow a user to configure a network interface including:
      selection of a type of interface desired;
      selection between a synchronized clock and a sourced clock;
      selection of whether phantom power will be provided; and
      selection between user-side or network-side; and
   receiving input signals from a user designating the selections; and
   a processor operable to receive the input signals and configure the interface in accordance with those selections.

10. A computer-readable medium including software code, such that when the software code is executed it results in:
    a user interface to allow independent selection of parameters of a serial interface;
    reception of inputs indicating settings for the parameters; and
    configuration of the interface in accordance with the settings at any time.

* * * * *